US012756310B2

(12) United States Patent
Khurana et al.

(10) Patent No.: US 12,756,310 B2
(45) Date of Patent: Oct. 6, 2026

(54) CIRCUIT, SYSTEM, AND METHOD FOR A POWER CONVERTER WITH A CONTROLLER UTILIZING A PREDICTED GATE CONTROL SIGNAL

(71) Applicant: TEXAS INSTRUMENTS INCORPORATED, Dallas, TX (US)

(72) Inventors: Vineet Khurana, New Delhi (IN); Rinu Mathew, Kerala (IN); Gayathri Murugesh, Coimbatore (IN); Aniruddha Periyapatna Nagendra, Bangalore (IN); Prachi Mishra, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 730 days.

(21) Appl. No.: 17/966,664

(22) Filed: Oct. 14, 2022

(65) Prior Publication Data

US 2023/0253881 A1 Aug. 10, 2023

(30) Foreign Application Priority Data

Feb. 9, 2022 (IN) ............................. 202241006871

(51) Int. Cl.

| | |
|---|---|
| ***H02M 3/158*** | (2006.01) |
| ***H02M 1/00*** | (2006.01) |
| ***H02M 1/08*** | (2006.01) |

(52) U.S. Cl.

CPC ......... *H02M 3/158* (2013.01); *H02M 1/0012* (2021.05); *H02M 1/0016* (2021.05); *H02M 1/0025* (2021.05); *H02M 1/08* (2013.01)

(58) Field of Classification Search

CPC . H02M 1/0025; H02M 1/0016; H02M 1/0012
See application file for complete search history.

(56) References Cited

U.S. PATENT DOCUMENTS 10,845,833 B1 11/2020 Dietrich
2005/0168198 A1* 8/2005 Maksimovic ....... H02M 1/4225 323/222

(Continued)

OTHER PUBLICATIONS

Han, K., et al., "Robust Estimator-Based Dual-Mode Predictive Fault-Tolerant Control for Constrained Linear Parameter Varying Systems," IEEE Transactions on Industrial Informatics, vol. 17, No. 2, Jul. 2021, pp. 4469-4479.

(Continued)

*Primary Examiner* — Monica Lewis
*Assistant Examiner* — Jye-June Lee
(74) *Attorney, Agent, or Firm* — Michelle F. Murray; Frank D. Cimino

(57) ABSTRACT

In some examples, a circuit includes sensing circuitry, a synchronization circuit, and a controller. The sensing circuitry is configured to provide a comparison result based on a comparison between a reference voltage and a feedback voltage. The synchronization circuit is configured to synchronize the comparison result into a clock domain to form a synchronous comparison result. The controller is configured to receive the synchronous comparison result, determine a predicted gate control signal based on the synchronous comparison result, determine a gate control signal based on the synchronous comparison result, provide the predicted gate control signal to the sensing circuitry as the feedback voltage, and provide the gate control signal for controlling a power converter.

18 Claims, 5 Drawing Sheets

(56) References Cited

U.S. PATENT DOCUMENTS

| | | | | |
|---|---|---|---|---|
| 2008/0094861 | A1* | 4/2008 | Wang | H02M 3/156<br>363/21.11 |
| 2013/0207627 | A1* | 8/2013 | Kahn | H02M 3/1588<br>323/282 |

OTHER PUBLICATIONS

Wu, X., et al., "Simplified Discrete-Time Modeling for Convenient Stability Prediction and Digital Control Design," IEEE Transactions on Power Electronics, vol. 28, No. 11, Nov. 2013, 5333-5342.

International Search Report dated May 9, 2023, PCT Application No. PCT/US2023/011810, 4 pages.

Written Opinion dated May 9, 2023, PCT Application No. PCT/US2023/011810, 6 pages.

* cited by examiner

CIRCUIT, SYSTEM, AND METHOD FOR A POWER CONVERTER WITH A CONTROLLER UTILIZING A PREDICTED GATE CONTROL SIGNAL

CROSS-REFERENCE TO RELATED APPLICATIONS

The present application claims priority to Indian. Provisional Patent Application No. 202241006871, which was filed Feb. 9, 2022, and is hereby incorporated herein by reference in its entirety.

BACKGROUND

A switched mode power supply (SMPS) transfers power from an input power source to a load by switching one or more power transistors or other switching elements coupled through a switch node/terminal to an energy storage element (such as an inductor, an inductance of a transformer, and/or a capacitor), which is capable of coupling to the load. If the input voltage is greater than the output voltage, the converter may be referred to as a "step-down" converter/regulator or a "buck converter." The power transistors can be included in a power converter that includes, or is capable of coupling to, the energy storage element. A SMPS can include a SMPS controller to provide one or more gate drive signals to the power transistor(s).

SUMMARY

In some examples, a circuit includes sensing circuitry, a synchronization circuit, and a controller. The sensing circuitry is configured to provide a comparison result based on a comparison between a reference voltage and a feedback voltage. The synchronization circuit is configured to synchronize the comparison result into a clock domain to form a synchronous comparison result. The controller is configured to receive the synchronous comparison result, determine a predicted gate control signal based on the synchronous comparison result, determine a gate control signal based on the synchronous comparison result, provide the predicted gate control signal to the sensing circuitry as the feedback voltage, and provide the gate control signal for controlling a power converter.

In some examples, a system includes a load, a power converter, and control circuitry. The power converter is provided to switch power from a power source to the load. The control circuitry is configured to provide a gate control signal for controlling the power converter to switch the power from the power source to the load. The control circuitry includes sensing circuitry, a synchronization circuit, and a controller. The sensing circuitry is configured to provide a comparison result based on a comparison between a reference voltage and a feedback voltage. The synchronization circuit is configured to synchronize the comparison result into a clock domain to form a synchronous comparison result. The controller is configured to receive the synchronous comparison result, determine a predicted gate control signal based on the synchronous comparison result, determine the gate control signal based on the synchronous comparison result, provide the predicted gate control signal to the sensing circuitry as the feedback voltage, and provide the gate control signal for controlling a power converter.

In some examples, a method includes determining a predicted gate control signal, determining a comparison result based on a comparison of a reference value to a feedback signal determined based on the predicted gate control signal, determining a gate control signal based on the comparison result, and providing the gate control signal for controlling a power converter.

DETAILED DESCRIPTION

Figure 1:
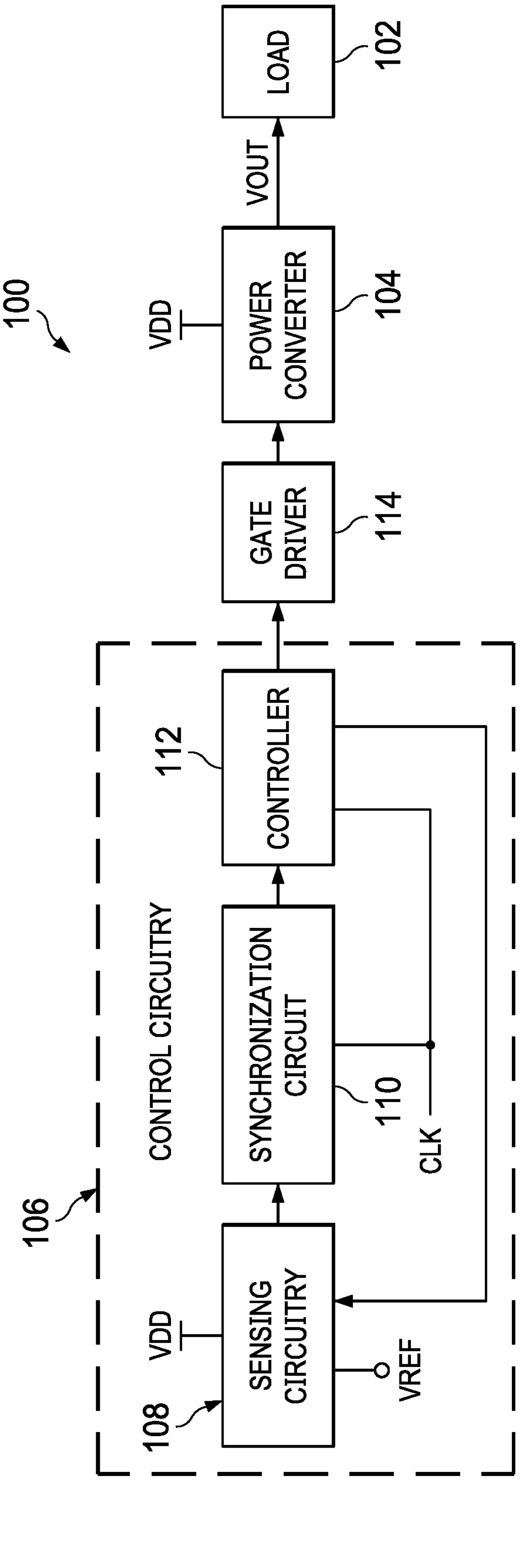
FIG. 1 is a block diagram of a system, in accordance with various examples.

As described above, a buck converter receives an input voltage (VDD) having a first value and provides an output voltage (VOUT) having a second value that is less than the first value. To control a mode of operation of the power converter, a controller provides gate control signals to one or more power transistors of the power converter. The gate control signals received by a power transistor control whether the power transistor is in a conductive state (e.g., turned on) or in a non-conductive state (e.g., turned off). Each state of a power converter involves a specific combination of transistors that are in conducting states and transistors that are in non-conducting states. To change a mode of operation of the power converter, the controller modifies the sequence of switching states that it commands the transistors to assume. In at least some examples, the controller implements a state machine or other logic such that values of the gate control signals are determined based on a mode of operation of, or for, the power converter.

For a buck converter, the control signals may be pulse frequency modulation (PFM) signals that control an amount of time that a top switch (e.g., power transistor) of the power converter is conductive, thereby controlling a charge time of an inductive element of the buck converter and a value of VOUT. To determine an amount of time for the control signal to cause the top switch to be conductive, the controller may rely on information of a value of VDD, such as whether VDD is greater than or less than a threshold value, such as a reference value or reference voltage. To determine this information, supply awareness may be implemented to estimate a charge time for the buck converter. Supply awareness, as used herein, refers to consideration of a value of VDD in determining the charge time for the buck converter. The supply awareness may be implemented by a supply awareness analog-to-digital converter (SA ADC). The SA ADC converts a difference between VDD and the threshold value, which may be based on or derived from VOUT, to a digital code. In this way, the SA ADC includes knowledge of a value of VDD (e.g., as provided by a power supply) in controlling the power converter, in comparison to other approaches for controlling a power converter based on VOUT and a reference or target value without including information of the value of VDD. Some supply awareness schemes are asynchronous, such as having components operating at different frequencies resulting from unsynchronized clock signals. However, such asynchronous approaches include a risk of capturing metastable values or experiencing clock domain crossing violations, degrading performance of the buck converter.

Examples of this description include a circuit that provides for synchronous supply awareness in a power supply. The power supply includes a power converter, such as a buck power converter, sensing circuitry, and control circuitry. The sensing circuitry includes digital, analog, or a combination thereof, components suitable for detecting a value of a signal, comparing that signal to a reference, and providing a comparison result. The control circuitry includes digital, analog, or a combination thereof, components suitable for receiving the comparison result and making control decisions for the power converter at least partially based on the comparison result. Based on the control decisions, the controller provides gate control signals for controlling the power converter. In some examples, the controller is, or implements, a finite state machine (FSM) or other circuitry suitable for performing processing or decision making based on received signals.

The control circuitry also includes a synchronization circuit. The synchronization circuit may increase an amount of delay in a critical path of the power supply, such as based on a number of clock cycles that elapse in the synchronizer providing an output signal based on a change input signals. This increased delay, in combination with a time that elapses for the controller to provide the gate control signals and the sensing circuitry to provide the comparison result, may cause the gate control signals to be provided after a charge time window (e.g., late). In some examples, the synchronization circuit and the controller operate in parallel with the sensing circuitry to decrease an amount of delay in a critical path of the power supply. For example, while the sensing circuitry is determining a current comparison result (e.g., for a time t), the synchronization circuit and the controller are operating according to an immediately preceding comparison result (e.g., for a time t−1). In some examples, a masking is performed at an output of the sensing circuitry, such as via an AND logic gate, to mitigate the occurrence of glitches resulting from state transitions of the controller. In some examples, the controller has multiple states corresponding to providing of the gate control signals. Delay of the controller may be further decreased by, for example, programming an idle state of the controller to state 1 of the states rather than state 0.

FIG. 1 is a block diagram of a system 100, in accordance with various examples. The system 100 is representative of an application in which power is provided to a load. For example, the system 100 is representative of an automobile or other vehicle, a computing device such as a laptop, a notebook, a server, a smartphone, a tablet, a wearable device, or the like, a SMPS or other power supply, etc. In an example, the system 100 includes a load 102, a power converter 104, and control circuitry 106. The control circuitry 106 includes sensing circuitry 108, a synchronization circuit 110, and a controller 112. In an example, the control circuitry 106 is the SAADC, as described above. The system 100 also includes a gate driver 114. While shown in FIG. 1 as separate from the power converter 104 and the control circuitry 106, in some examples, the gate driver 114 may be incorporated into the power converter 104 or the control circuitry 106. The components of the system 100 are coupled, in an example, as shown in FIG. 1. In an example, the controller 112 includes any suitable analog, digital, or combination thereof, components for implementing an architecture that operates in a digital domain. For example, the controller 112 receives a first analog signal having a value representative of a first binary value, performs one or more operations based on the first binary value, and provides a second analog signal having a value representative of a second binary value resulting from the performed operation(s). In an example, the controller 112 implements a finite state machine (FSM) that changes states based on the first binary value, where a resultant state controls the value of the second binary value.

In an example of operation of the system 100, the power converter 104 receives a VDD from a power source (not shown) and provides a voltage VOUT based on VDD and control exerted by the control circuitry 106. In some implementations, the power converter 104 is a buck power converter such that VOUT is less than VDD. VOUT is provided, for example, to the load 102, such as to power components (not shown) of the load 102 and/or facilitate other operation of the load 102. In an example, the control circuitry 106 controls the power converter 104 according to PFM. For example, the control circuitry 106 provides gate control signals that cause the gate driver 114 to provide gate drive signals to turn switches of the power converter 104 on or off. The gate control signals may be timed such that a switch of the power converter 104 is on (e.g., in a conductive state) for an amount of time determined based on a programmed value for VOUT. For example, for a greater value of VOUT with respect to VDD the gate control signals may cause the switch of the power converter 104 to be on for a longer period of time than for a lesser value of VOUT with respect to VDD.

To determine the amount of time for controlling the switch of the power converter 104 to be on, the sensing circuitry 108 compares a reference voltage (VREF) indicative of the programmed value for VOUT to a feedback voltage. Responsive to the feedback voltage being greater in value than the reference voltage, the control circuitry 106 (e.g., via the controller 112) provides the gate control signals such that an amount of time for the switch of the power converter 104 to be on is decreased. Responsive to the feedback voltage being greater in value than the reference voltage, the control circuitry 106 provides the gate control signals such that an amount of time for the switch of the power converter 104 to be on is increased. The feedback voltage is determined, in some examples, based on a value provided by a programmable resistor (not shown), where a resistance of that programmable resistor is controlled according to a predicted gate control signal provided by the controller 112. In an example, the synchronization circuit 110 synchronizes an output of the sensing circuitry 108 with a clock domain of the controller 112. For example, both the synchronization circuit 110 and the controller 112 may be clocked by a same clock signal (CLK) to facilitate the synchronization. Synchronizing the output of the sensing circuitry 108 with a clock domain of the controller 112, in some examples, mitigates metastability concerns associated with the output of the sensing circuitry 108. In some examples, the synchronization circuit 110 and controller 112 determine a value for controlling the power converter 104 during one time period while the sensing circuitry 108 determines an output value for an immediately subsequent, or next, time period.

Figure 2:
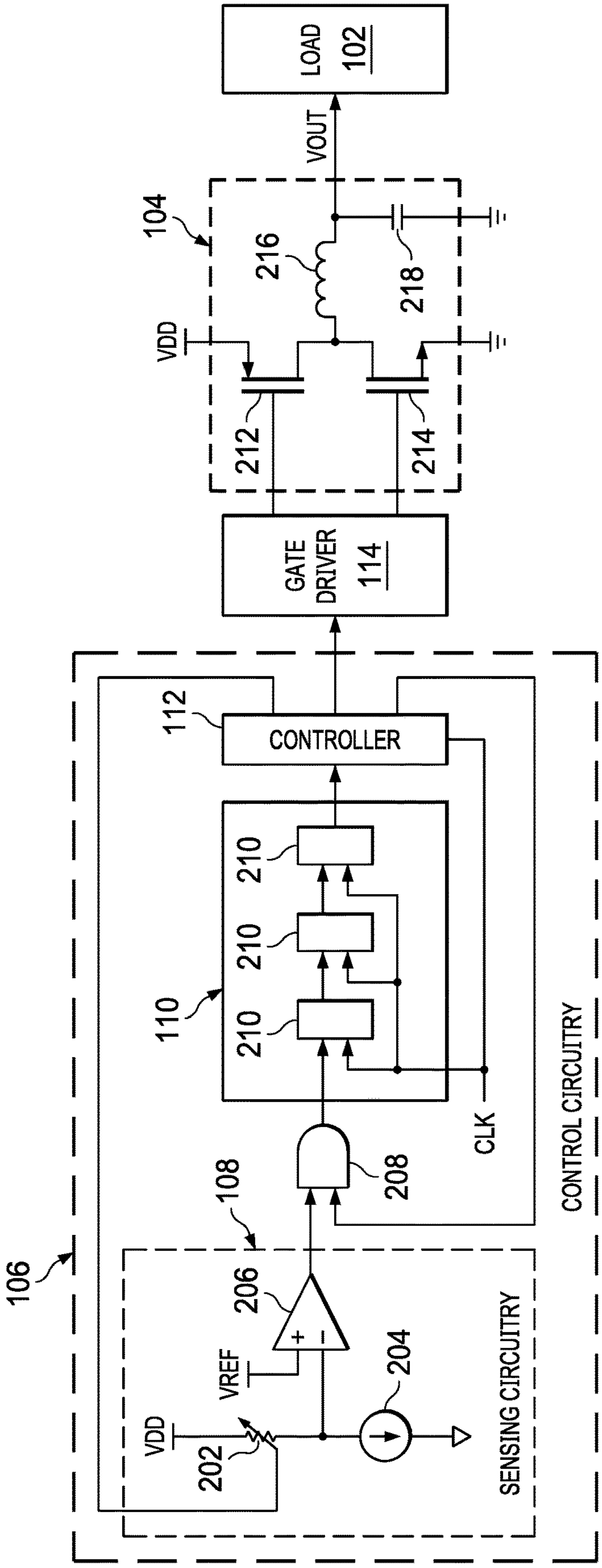
FIG. 2 is a block diagram of control circuitry, in accordance with various examples.

FIG. 2 is a block diagram of the control circuitry 106, in accordance with various examples. As described above, the control circuitry 106 includes sensing circuitry 108, synchronization circuit 110, and controller 112. The sensing circuitry 108 includes a programmable or variable resistor 202, a current source 204, and a comparator 206. In an example, the control circuitry 106 also includes a logic circuit 208 coupled between the sensing circuitry 108 and the synchronization circuit 110. However, in other examples the logic circuit 208 may be omitted and the sensing circuitry 108 may be coupled to the synchronization circuit 110. The components of the control circuitry 106 are coupled, in an example, as shown in FIG. 2.

In an example of operation, the controller 112 provides multiple output signals. A first of the output signals may be a gate control signal. The gate control signal may be provided to the gate driver 114 to control providing of gate drive signals by the gate driver 114 to the power converter 104. In some examples, the gate control signal is representative of a bus or other collection of individual signal lines, such as signal lines that each carry a single bit of a signal. In other examples, the gate control signal is provided via a single coupling, such as according to serial signaling. In an example, the gate control signal includes four bits of data, though in other examples any number of bits may be used. The four bits of data of the control signal are representative of a decimal value in a range of 0 to 15, inclusive, and indicate a charge time for the power converter 104. A second of the output signals may be a predicted gate control signal. The predicted gate control signal may be provided to the sensing circuitry 108 to control determination of an output signal of the sensing circuitry 108. In some examples, the predicted gate control signal is representative of a bus or other collection of individual signal lines, such as signal lines that each carry a single bit of a signal. In other examples, the predicted gate control signal is provided via a single coupling, such as according to serial signaling. In an example, the predicted gate control signal includes four bits of data, though in other examples any number of bits may be used. In at least some examples, the predicted gate control signal has a same number of bits as the gate control signal. The four bits of data of the predicted control signal are representative of a decimal value in a range of 0 to 15, inclusive, and indicate a predicted charge time for the power converter 104. In an implementation, a predicted gate control signal becomes the gate control signal in an immediately subsequent clock cycle of the system 100. A third of the output signals may be a mask. The mask may be a single bit and may be provided to the logic circuit 208 in implementations of the control circuitry 106 that include the logic circuit 208. The mask bit may have a deasserted value for two clock cycles of the control circuitry 106 and an asserted value for a next consecutive two clock cycles of the controller 112 with this pattern repeating to mitigate the occurrence of glitches resulting from state transitions of the controller 112 during the deasserted periods. For example, an output signal of the comparator 206 may include glitches, or false values within a first two clock cycles of the predicted gate control signal changing in value. Masking the output of the comparator 206 may mitigate such glitches adversely affecting operation of the controller 112.

Based on a value of the predicted gate control signal, a resistance of the resistor 202 is modified to cause, in combination with a current sunk by the current source 204, a voltage to be provided at an inverting input of the comparator 206. In some examples, the resistor 202 is implemented as a resistor ladder with a plurality of switches (not shown) that are respectively controlled according to one bit of the predicted gate control signal to program the resistance of the resistor 202. In an example, the voltage provided at the inverting input of the comparator 206 is based on VDD, as modified by the resistance of the resistor 202, controlled based on the predicted gate control signal, as described herein. A non-inverting input of the comparator 206 may be configured, via any suitable coupling, circuit architecture, or component, to receive a reference signal having a programmed value for VOUT (e.g., indicative of an intended value for VOUT). Based on a comparison of values at its non-inverting and inverting inputs, the comparator 206 provides an output signal (e.g., a comparison result) indicating whether the reference signal has a value greater than the voltage provided by the resistor 202. Responsive to the reference signal being greater in value than the voltage provided by the resistor 202, the comparator 206 provides the comparison result having a value of 1. Responsive to the voltage provided by the resistor 202 being greater in value than the reference signal, the comparator 206 provides the comparison result having a value of 0. The comparison result is provided to the logic circuit 208, in implementations in which the logic circuit 208 is included in the control circuitry 106. The logic circuit 208, in some examples, performs a logical operation between the comparison result received from the sensing circuitry 108 and the mask received from the controller 112. In some implementations, that logical operation is a logical AND. The logic circuit 208, in some examples, protects against glitches in the comparison result affecting operation of the synchronization circuit 110 or the controller 112. An output of the logic circuit 208, or the comparison result of the sensing circuitry 108 in implementations of the control circuitry 106 that omit the logic circuit 208, is provided to the synchronization circuit 110.

The synchronization circuit 110 may have any suitable architecture for performing signal synchronization. In an example, the synchronization circuit includes multiple latches 210, such as three latches 210. The latches 210 may be cascaded in series where a first of the latches 210 receives an input of the synchronization circuit 110 and its output is provided as an input of the next latch 210, continuing serially, until an output provided by a final latch 210 of the serial cascade is provided as an output of the synchronization circuit 110. Each latch 210 of the synchronization circuit 110 may be clocked by CLK, as received by the synchronization circuit 110 at a clock input of the synchronization circuit 110, which may also be received at a clock input of the controller 112 and clock the controller 112. In this way, the input signal to the synchronization circuit 110 may be synchronized into a clock domain of the controller 112. The synchronization mitigates glitches or other adverse effects in operation of the control circuitry 106 or power converter 104 resulting from metastability of an asynchronous input signal to the controller 112.

In some examples, the controller 112 implements a finite state machine or other control process. The controller 112 receives an output signal of the synchronization circuit 110 and, based on that output signal, determines a value for the gate control signal and the predicted gate control signal. Responsive to the output signal of the synchronization circuit 110 having a value of 0, the state machine may reset to a state of 0. Responsive to the output signal of the synchronization circuit 110 having a value of 1, the state machine may increment a state of operation by 1. Based on the state of the state machine, the controller 112 provides the gate control signals to the gate driver 114 to control the power converter 104, as described in greater detail below.

In an example, the power converter 104 includes a transistor 212, a transistor 214, an inductor 216, and a capacitor 218. The transistor 212 has a gate coupled to a first output of the gate driver 114, a source coupled to a power supply (not shown) to receive VDD, and a drain. The transistor 214 has a gate coupled to a second output of the gate driver 114, a source coupled to ground, and a drain coupled to the drain of the transistor 212. The inductor 216 has a first terminal coupled to the drain of the transistor 212 and a second terminal coupled to ground through the capacitor 218. In an example, an output of the power converter 104 (e.g., VOUT) is provided at the second terminal of the inductor 216 such that, in the example of FIG. 1, an input of the load 102 is coupled to the second terminal of the inductor 216. Based on a value of the gate control signal, as described above, the gate driver 114 controls the transistor 212 and the transistor 214 to be in alternating states for an amount of time proportional to the value of the gate control signal. For example, the gate driver 212 causes the transistor 212 to be in a conductive state (and the transistor 214 to correspondingly be in a non-conductive state) for an amount of time proportional to the value of the gate control signal. While the transistor 212 is in the conductive state, current flows from the power supply providing VDD to the inductor 216 to charge the inductor 216. At an expiration of the amount of time proportional to the value of the gate control signal, the gate driver 114 causes the transistor 212 to be in a non-conductive state (and the transistor 214 to correspondingly be in a conductive state). While the transistor 214 is in the conductive state, stored charge of the inductor 214 discharges through the second terminal of the inductor 216 to charge the capacitor 218 and to transfer to the load 102.

Figure 3:
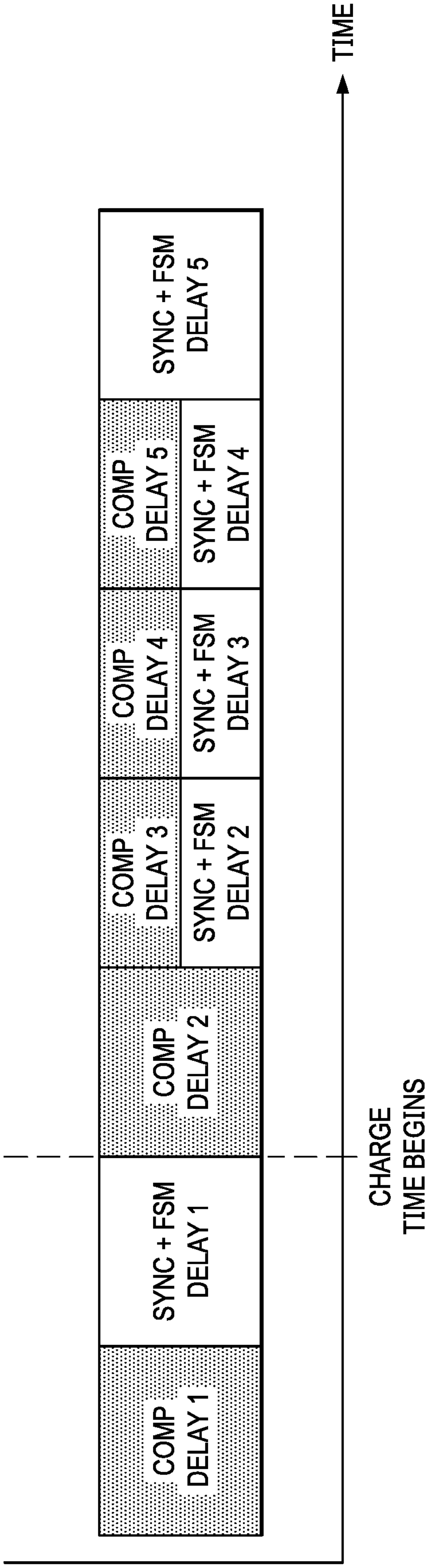
FIG. 3 is a timing diagram for operation of control circuitry, in accordance with various examples.

FIG. 3 is a timing diagram 300 for operation of the control circuitry 106, in accordance with various examples. As shown in the diagram 300, operation of the control circuitry 106 begins prior to a charge time of the power converter 104 beginning. Subsequent to charging of the power converter 104 beginning, the control circuitry 106 operates in parallel such that the sensing circuitry 108 is determining a comparator output X while the synchronization circuit 110 and the controller 112 determine gate control signals based on a previous comparator output (e.g., a comparator output X−1). Such parallelism of the control circuitry 106 facilitates decreased delay in determining a value of an output signal of the control circuitry 106 responsive to a change in value of an input signal of the control circuitry 106.

Figure 4:
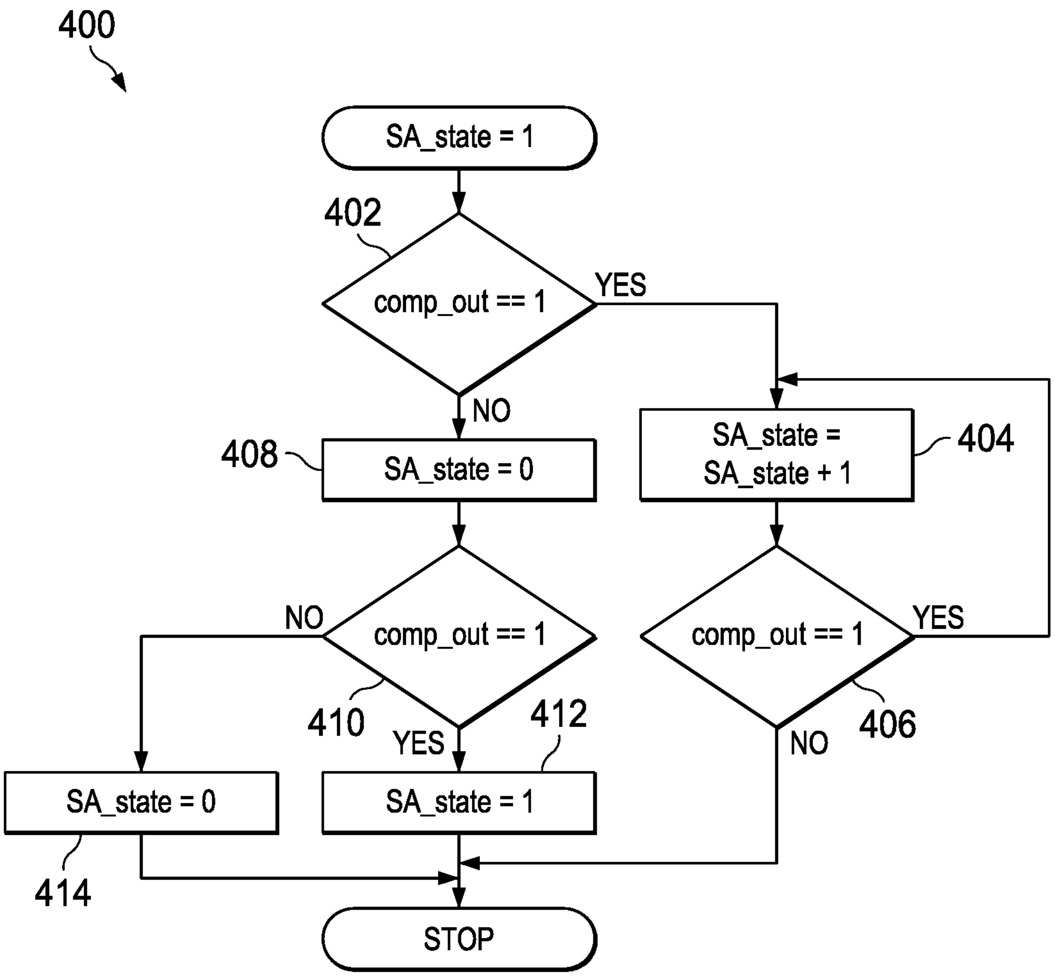
FIG. 4 is a flow diagram of a method for operation of a controller, in accordance with various examples.

FIG. 4 is a flow diagram of a method 400 for operation of the controller 112, in accordance with various examples. In some examples the method 400 is representative of operation of a state machine implemented by the controller 112. A state of operation of the state machine, or more simply, a state, is a status of a system implementing the state machine. A transition is a change from one state to another state, occurring when a programmed condition is met, a programmed event occurs, or the like. Based on a particular combination of input values, sequence of inputs, or both, transitions occur from one state to another state. At least some of the states are associated with output signals, which may be unique to a state or may be shared in common with other states. In the example of FIG. 4, a given state may correspond to a value for the gate control signal and the predicted gate control signal. For example, a value of a state (e.g., state 1, state 2, state 3, . . . state X) prior to a transition or after a transition may be directly provided by the controller 112 as a value for the gate control signal or the predicted gate control signal. In an example, a value of a current state is provided as the predicted gate control signal, and a value of an immediately preceding state, after transition, is provided as the gate control signal. With each transition, the value of the state of the state machine may be changed, thus resulting in a different value for the gate control signal or the predicted gate control signal upon a subsequent transition, where the transitions are conditioned on a result of a comparison of VREF and a signal based on VDD and manipulated according to a value of VOUT.

Conventionally, a state machine may begin at a state 0 as a reset, or default, state. As shown in FIG. 4, the state machine implemented by the controller 112 may begin at state 1. States are represented in FIG. 4 as SA_state. The controller 112 implementing state 1 as the default state rather than state 0 may decrease a delay time of the controller 112 in transitioning among states of the state machine. In some examples, a value of a state of operation of the state machine is the predicted gate control value and state decisions are made every four clock cycles of the controller 112 (e.g., every 80 nanoseconds (ns) for a 20 ns clock).

At operation 402, a determination is made as to whether an output of the comparator 206, indicated in FIG. 4 as comp out, has a value of 1. While described with respect to FIG. 4 as being the output signal of the comparator 206, the signal received and considered by the controller 112 may in fact have been processed by the logic circuit 208 and/or the synchronization circuit 110. However, because neither the logic circuit 208 nor the synchronization circuit 110 should change a value of the output signal of the comparator 206 (e.g., from 1 to 0 or vice versa), assuming normal (e.g., error-free) operation, the signal received by the controller 112 is discussed with reference to the output of the comparator 206. Responsive to comp out having a value of 1, the method 400 proceeds to operation 404.

At operation 404, the controller 112 provides the gate control signal having a value of the state of operation of the state machine (in a first instance of operation 404 after proceeding directly from operation 402, a value of "1"), increments a state of operation of the state machine by 1, provides the predicted gate control signal having a value of the new state of operation of the state machine (in a first instance of operation 404 after proceeding directly from operation 402, a value of "2"), and proceeds to operation 406.

At operation 406, a determination is made as to whether an output of the comparator 206 has a value of 1. In at least some examples, the output of the comparator 206 is a next output of the comparator 206 and differs from the output of the comparator 206 considered at operation 402. Responsive to comp out having a value of 1, the method 400 returns to operation 404. Responsive to comp out not having a value of 1, the method 400 ends.

Returning to operation 402, responsive to comp out not having a value of 1, the method 400 proceeds to operation 408. At operation 408, the controller 112 provides the gate control signal having a value of the state of operation of the state machine (in a first instance of operation 408 after proceeding directly from operation 402, a value of "1"), decrements a state of operation of the state machine to zero, provides the predicted gate control signal having a value of the new state of operation of the state machine (in a first instance of operation 408 after proceeding directly from operation 402, a value of "0") and proceeds to operation 410.

At operation 410, a determination is made as to whether an output of the comparator 206 has a value of 1. In at least some examples, the output of the comparator 206 is a next output of the comparator 206 and differs from the output of the comparator 206 considered at operation 402. Responsive to comp out having a value of 1, the method 400 proceeds to operation 412. Responsive to comp out not having a value of 1, the method 400 proceeds to operation 414.

At operation 412, the controller 112 provides the gate control signal having a value of the state of operation of the state machine, increments the state of operation of the state machine by 1, and the method 400 ends.

At operation 414, the controller 112 provides the gate control signal having a value of the state of operation of the state machine, maintains the state of operation of the state machine at zero, and the method 400 ends.

Figure 5:
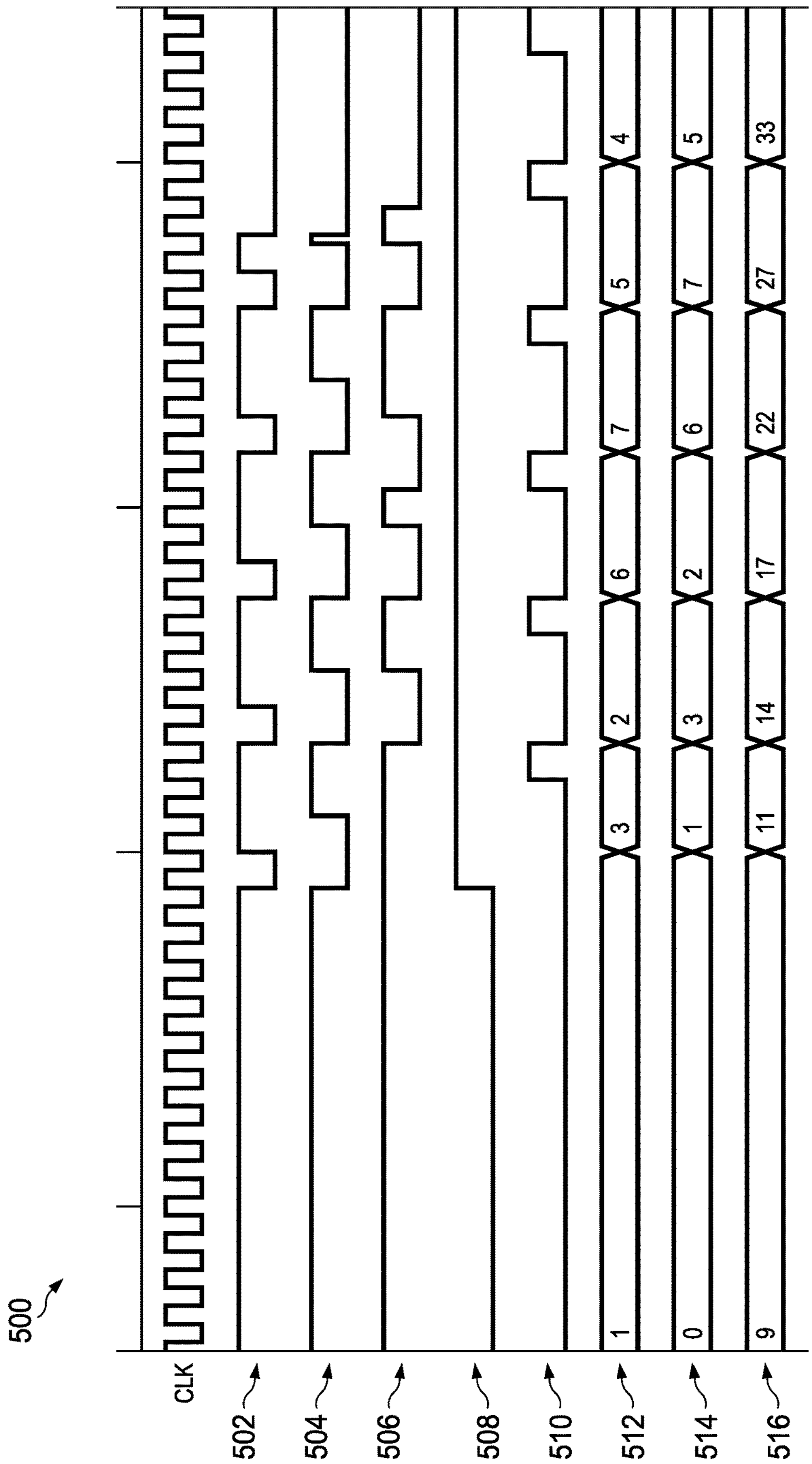
FIG. 5 is a diagram of signal waveforms, in accordance with various examples.

FIG. 5 is a diagram of signal waveforms 500, in accordance with various examples. In some examples, the waveforms are representative of signals in the system 100, described above with respect to FIG. 1, such as signals of the control circuitry 106. In an example, each of the signals of the waveforms 500 is a binary signal, having asserted and deasserted values represented on a vertical axis and having a horizontal axis representative of time. The waveforms 500 include CLK, a signal 502 that is the output signal of the comparator 206, a signal 504 that is an output of the logic circuit 208, a signal 506 that is an output of the synchronization circuit 110, a signal 508 that is an enable signal for the state machine implemented by the controller 112 (e.g., such as may be received by the controller 112 from an outside source), a signal 510 that is a sample signal that causes the signal 506 to be sampled for determining the predicted gate control signal, a signal 512 that is the predicted gate control signal, a signal 514 that is the gate control signal, and a signal 516 that indicates a charge time for the power converter 104 based on signal 514. At an expiration of the charge time indicated by signal 516, signal 508 may be deasserted. As shown by the signal 502, a time elapsed for a decision by the comparator 206 and providing of an output value from the comparator may be, in some examples, about 80 ns. In such an example, as shown by the signal 504, a mask may be applied to the output of the comparator 206, such as via the logic circuit 208. For example, it is possible for the signal 502 to include glitches or other erroneous values, although none are shown in FIG. 5. In such examples, these glitches, if left unmitigated, could adversely affect operation of the system 100. By masking the output signal of the comparator 206 for 2-3 cycles of CLK and then sampling the output of the comparator 206, a possibility of these glitches affecting the system 100 is reduced. As shown in FIG. 5, the signal 512 and the signal 514 are gray encoded signals. However, any other suitable encoding scheme may be used. As shown by the waveforms 500, as the signal 514 increases in value, so too does the signal 516.

The term "couple" is used throughout the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Modifications are possible in the described examples, and other examples are possible within the scope of the claims.

What is claimed is:

1. A circuit, comprising:

a sensing circuit configurable to provide a comparison result based on a comparison between a reference voltage and a feedback voltage;

a synchronization circuit configurable to, based on a clock signal and the comparison result, produce a synchronous comparison result; and a controller configurable to, based on the clock signal:

receive the synchronous comparison result;

determine a predicted gate control signal based on the synchronous comparison result;

determine a gate control signal based on the synchronous comparison result;

provide the predicted gate control signal to the sensing circuit as the feedback voltage; and provide the gate control signal.

2. The circuit of claim 1, wherein the sensing circuit is further configurable to provide a second comparison result based on a comparison between the reference voltage and the predicted gate control signal in parallel with the controller determining and providing the gate control signal.

3. The circuit of claim 1, wherein the sensing circuit has a first sensing circuit input coupled to a first output of the controller, a second sensing circuit input configurable to receive the reference voltage; and a third sensing circuit input configurable to receive a voltage from a power supply, and wherein the sensing circuit includes:

a second comparator having a first comparator input coupled to the second sensing circuit input, a second comparator input, and a comparator output;

a variable resistor coupled between the third sensing circuit input and the first comparator input and having a control input coupled to the first sensing circuit input; and a current source coupled between the second comparator input and ground.

4. The circuit of claim 3, further comprising a logic circuit having a first input coupled to the comparator output, a second input coupled to a second output of the controller, and a logic circuit output.

5. The circuit of claim 4, wherein the synchronization circuit has a data input coupled to the logic circuit output, a clock input coupled to a clock input of the controller, and an output coupled to an input of the controller.

6. The circuit of claim 5, further comprising a gate driver having an input coupled to a third output of the controller and a power converter having an input coupled to an output of the gate driver.

7. The circuit of claim 1, wherein the gate control signal corresponds to a charge time for a power converter, wherein the charge time increases responsive to the synchronous comparison result having an asserted value, and wherein the charge time decreases responsive to the synchronous comparison result having a deasserted value.

8. The circuit of claim 1, wherein the controller implements a state machine configurable to determine the gate control signal, wherein while the controller operates in a first state of the state machine to provide the gate control signal, the sensing circuit is configurable to determine a next comparison result in parallel for causing the controller to operate in a second state of the state machine to provide a subsequent gate control signal.

9. A system, comprising:

a load;

a power source;

a power converter configurable to switch power from the power source to the load; and control circuitry configurable to provide a gate control signal for controlling the power converter to switch the power from the power source to the load, the control circuitry including:

a sensing circuit configurable to provide a comparison result based on a comparison between a reference voltage and a feedback voltage;

a synchronization circuit configurable to, based on a clock signal and the comparison result, produce a synchronous comparison result; and a controller configurable to:

receive the synchronous comparison result;

determine a predicted gate control signal based on the synchronous comparison result;

determine the gate control signal based on the synchronous comparison result;

provide the predicted gate control signal to the sensing circuit as the feedback voltage; and provide the gate control signal for controlling the power converter.

10. The system of claim 9, further comprising a gate driver coupled between the control circuitry and the power converter and configurable to:

receive the gate control signal; and provide a gate drive signal based on the gate control signal to the power converter for controlling the power converter to switch the power from the power source to the load, wherein the gate drive signal controls a charge time of the power converter.

11. The system of claim 9, wherein includes:

a comparator having a first comparator input configurable to receive the reference voltage indicative of a programmed voltage to be output by the power converter to the load, a second comparator input, and a comparator output;

a variable resistor coupled between the power source and the first comparator input and having a control input coupled to a first output of the controller; and a current source coupled between the second comparator input and ground.

12. The system of claim 11, further comprising a logic circuit having a first input coupled to the comparator output, a second input coupled to a second output of the controller, and a logic circuit output.

13. The system of claim 9, wherein the controller implements a state machine configurable to determine the gate control signal, wherein while the controller operates in a first state to provide the gate control signal the sensing circuit is determining a next comparison result in parallel for causing the controller to operate in a second state to provide a subsequent gate control signal.

14. The system of claim 13, wherein the sensing circuit determines the next comparison result based on the predicted gate control signal and the reference voltage indicative of a programmed voltage for output by the power converter to the load.

15. The system of claim 9, wherein the gate control signal corresponds to a charge time for the power converter, wherein the charge time increases responsive to the synchronous comparison result having an asserted value, and wherein the charge time decreases responsive to the synchronous comparison result having a deasserted value.

16. A method, comprising:

determining a first predicted gate control signal;

determining a second predicted gate control signal;

determining a comparison result based on a comparison of a reference value to a feedback signal determined based on the first predicted gate control signal;

determining a gate control signal based on the comparison result;

while determining the gate control signal based on the comparison result, determining a second comparison result based on a comparison of the reference value to a feedback signal determined based on the second predicted gate control signal; and providing the gate control signal for controlling a power converter.

17. The method of claim 16, further comprising incrementing an operational state from a state 1 to a state 2 responsive to the comparison result having a value of 1 and incrementing the operational state from the state 2 to a state 3 responsive to the second comparison result having a value of 1.

18. The method of claim 16, further comprising decrementing an operational state from a state 1 to a state 0 responsive to the comparison result not having a value of 1 and incrementing the operational state from the state 0 to the state 1 responsive to the second comparison result having a value of 1 or maintaining the operational state 0 responsive to the second comparison result not having a value of 1.

* * * * *